(12) United States Patent
Jung et al.

(10) Patent No.: US 9,092,070 B2
(45) Date of Patent: Jul. 28, 2015

(54) METHOD AND APPARATUS FOR SCROLLING A SCREEN IN A DISPLAY APPARATUS

(71) Applicant: Samsung Electronics Co., Ltd., Gyeonggi-do (KR)

(72) Inventors: Yung-Keun Jung, Gyeonggi-do (KR); Jae-Myeon Lee, Gyeonggi-do (KR); Hyun-Su Hong, Gyeonggi-do (KR)

(73) Assignee: Ssmsung Electronics Co., Ltd (KR)

( * ) Notice: Subject to any disclaimer, the term of this patent is extended or adjusted under 35 U.S.C. 154(b) by 161 days.

(21) Appl. No.: 13/776,086

(22) Filed: Feb. 25, 2013

(65) Prior Publication Data

US 2013/0222243 A1    Aug. 29, 2013

(30) Foreign Application Priority Data

Feb. 24, 2012 (KR) .................. 10-2012-0019206

(51) Int. Cl.
| | | |
|---|---|---|
| *G06F 3/033* | (2013.01) | |
| *G06F 3/0485* | (2013.01) | |
| *G06F 3/0488* | (2013.01) | |
| *G06F 3/0346* | (2013.01) | |
| *G06F 1/16* | (2006.01) | |

(52) U.S. Cl.
CPC .............. *G06F 3/033* (2013.01); *G06F 1/1694* (2013.01); *G06F 3/0346* (2013.01); *G06F 3/0485* (2013.01); *G06F 3/04883* (2013.01); *G06F 2200/1637* (2013.01)

(58) Field of Classification Search
CPC ..... G06F 3/0346; G06F 3/017; G06F 3/0304; G06F 3/038; G06F 3/033; G06F 3/03547; G06F 3/011

USPC .......... 345/158, 156, 659; 715/778, 792, 797, 715/803

See application file for complete search history.

(56) References Cited

U.S. PATENT DOCUMENTS 5,602,566 A * 2/1997 Motosyuku et al. .......... 345/684
6,624,824 B1 * 9/2003 Tognazzini et al. .......... 345/684

(Continued)

FOREIGN PATENT DOCUMENTS

| EP | 2 293 176 | 3/2011 |
|---|---|---|
| KR | 1020070079418 | 8/2007 |
| KR | 1020090076177 | 7/2009 |

OTHER PUBLICATIONS

Hamed H. Sad et al., "Evaluation and Modeling of User Performance for Pointing and Scrolling Tasks on Handheld Devices using Tilt Sensor", 2009 Second International Conferences on Advances in Computer-Human Interactions, Feb. 1, 2009.

(Continued)

*Primary Examiner* — Olga Merkoulova
(74) *Attorney, Agent, or Firm* — The Farrell Law Firm, P.C.

(57) ABSTRACT

A method of scrolling a screen in a display apparatus includes initiating a screen-scroll according to a speed of a currently generated flick input when the flick input is generated, comparing a tilt of an axis of a corresponding apparatus with an initial location at a time of generation of the flick input to determine whether a change amount of a change is within a reference value, maintaining a current screen-scroll speed if the change amount deviates from the reference value, and stopping a screen-scroll operation when a scroll stop condition is met.

16 Claims, 9 Drawing Sheets

(56) References Cited

U.S. PATENT DOCUMENTS

2007/0180409 A1　8/2007　Sohn et al.
2009/0181714 A1　7/2009　Yajima et al.
2010/0235794 A1　9/2010　Ording
2010/0269038 A1　10/2010　Tsuda
2010/0271401 A1*　10/2010　Fong ............................ 345/660

OTHER PUBLICATIONS

Joel F. Bartlett, "Rock 'n' Scroll Is Here to Stay", IEEE Computer Graphics and Applications, vol. 20, No. 3, May 2000.

Ian Oakley et al., "Tilt to Scroll: Evaluating a Motion Based Vibrotactile Mobile Interface", Proceedings of the First Joint Eurohaptics Conference and Symposium on Haptic Interfaces for Virtual Environment and Teleoperator Systems, Mar. 18, 2005.

* cited by examiner

| TILT SECTION | REFERENCE TILT | REFERENCE SCROLL SPEED | |
|---|---|---|---|
| B | $T_b$ | $V_b$ | |
| A | $T_a$ | $V_a$ | |
| O | $T_o$ | $V_o = 0$ | |
| C | $T_c$ | $V_c$ | |
| D | $T_d$ | $V_d$ | |
| | | | |

METHOD AND APPARATUS FOR SCROLLING A SCREEN IN A DISPLAY APPARATUS

PRIORITY

This application claims priority under 35 U.S.C. §119(a) to Korean Application Serial No. 10-2012-0019206, which was filed in the Korean Intellectual Property Office on Feb. 24, 2012, the contents of which are incorporated herein by reference.

BACKGROUND OF THE INVENTION

1. Field of the Invention

The present invention relates generally to technology for controlling a display screen of a display apparatus such as a portable phone, a Television (TV), or a tablet, and more particularly, to a method and an apparatus for scrolling a screen and for controlling a list view on a display by using a motion sensor mounted on an input apparatus capable of receiving a touch input.

2. Description of the Related Art

An electronic appliance directly controlled by a user usually includes at least one display apparatus, and the user may control the electronic appliance through an input apparatus while monitoring various operation states or application operations of a corresponding electronic appliance through the display apparatus. Particularly, in a portable terminal, a method of providing a user interface is widely provided in which the input apparatus is a touch screen instead of a rectangular manipulation button for causing up, down, left and right movements, due to the limited size of the portable terminal.

In one example, in a list view state where a plurality of related items including a Short Message Service (SMS) receiving and transmission item and a directory are displayed in a type of a plurality of a bars, boxes, or icons, a list item is moved by a screen-scroll method. When using a touch screen user interface, in order to manipulate movement between the list items, a drag (an operation which touches a point of the touch screen by a finger or a stylus pen, moves to another point while maintaining the touch and then stops and releases the touch) or a flick (an operation which touches a point of the touch screen by the finger or the stylus pen and quickly moves in a direction while releasing the touch) is used to move to a desired point. When a drag input is made, the screen-scroll operation is performed in the list view state according to a corresponding direction and a movement state, and if there is made a flick input, the screen-scroll is performed quickly according to a speed and a direction corresponding thereto and is stopped by decreasing the speed of the screen-scroll.

However, if there are many list items, selection of a desired list item may inconveniently require multiple drag or flick operations, and when the user wants to slowly check lists, an operation of touching the screen by a finger and moving the finger slowly in a corresponding speed is required. Particularly, in an appliance such as the portable terminal, which has a small display, a touch input unit and a display screen need to be used simultaneously, which causes a finger to frequently block the screen.

SUMMARY OF THE INVENTION

Accordingly, an aspect of the present invention provides a method and an apparatus for more conveniently scrolling a screen of a display apparatus by not requiring much manipulation in controlling a list view on a display.

Another aspect of the present invention provides a method and an apparatus for scrolling a screen of a display apparatus in which a list view is controlled by a minimum motion without a touch when large amounts of movement or slow and continuous movement is required in controlling the list view on a display.

In accordance with an aspect of the present invention, a method of scrolling a screen in a display apparatus includes initiating a screen-scroll according to a speed of a currently generated flick input when the flick input is generated, comparing a tilt of an axis (which is preset) of a corresponding apparatus with an initial location at a time of generation of the flick input to determine whether a change amount of a change is within a reference value (which is preset), maintaining a current screen-scroll speed if the change amount deviates from the reference value and stopping a screen-scroll operation when a scroll stop condition (which is preset) is met.

In accordance with another aspect of the present invention, a method of scrolling a screen in a display apparatus includes identifying, when the current screen-scroll speed is maintained, a tilt section corresponding to the current screen-scroll among a plurality of preset tilt sections, changing a tilt section coordinate system such that a reference tilt for a corresponding tilt section matches to a current tilt, identifying a reference tilt section of the changed coordinate system according to the current tilt to perform the screen-scroll operation according to a reference scroll speed for the identified tilt section, maintaining, when there is made no change in the identified tilt section, the current screen-scroll speed, and stopping the screen-scroll operation when the scroll stop condition is met

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, various embodiments of the present invention will be described with reference to the accompanying drawings. In the following description, a detailed description of known functions and configurations incorporated herein will be omitted when it may obscure the subject matter of the present invention.

Figure 1:
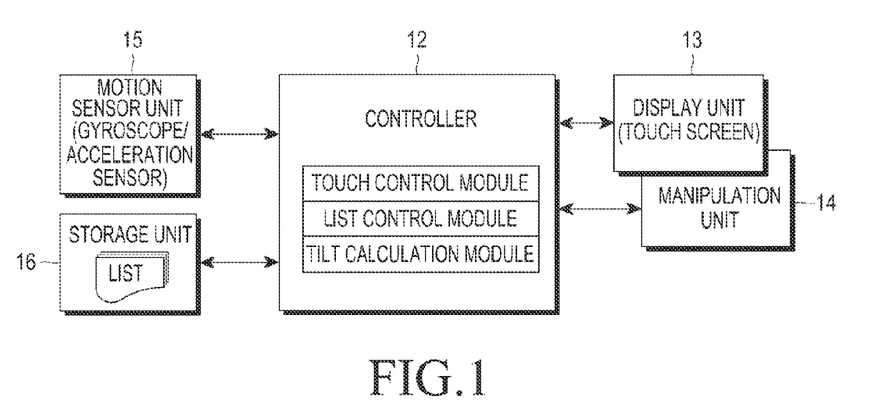
FIG. 1 illustrates an apparatus for performing a screen-scroll of a display apparatus according to an embodiment of the present invention.

FIG. 1 illustrates an apparatus for performing a screen-scroll of a display apparatus according to an embodiment of the present invention. Referring to FIG. 1, the apparatus includes a display unit 13 which generally includes a Liquid Crystal Display (LCD) and displays various information such as application execution images, various operation states, a menu state, and a list view of a corresponding apparatus and may be implemented in a touch screen structure. Further included is a manipulation unit 14 such as a touch screen control, associated with the display unit 13 to receive various touch input manipulations made by the user and is provided with a keypad or a button for manipulating a plurality of operations mechanically provided on an external housing of the corresponding apparatus, a motion sensor unit 15 including a gyroscope or an acceleration sensor, which measures a rotation state including a tilt and an acceleration of the corresponding apparatus to detect a motion state of the corresponding apparatus, a controller 12 which controls a motion of a corresponding apparatus 1 including a list view control operation related to the present invention by collectively controlling each function unit, and a storage unit 16 which stores an operation program related to an operation of the controller 12, various applications, and a data related to the list view.

When the apparatus is, for example, a portable terminal, a communication unit is further provided including an antenna for a wireless communication and performing a wireless signal processing operation for a wireless communication function and a voice-processing unit for processing a voice signal. When the apparatus is, for example, a TV remote controller, a short-range communication module is provided, such as an infrared communication module or Bluetooth® for communicating with a TV body apparatus. List items stored in the storage unit 16 may be provided in the TV body apparatus.

A list view control method according to the present invention, which can be performed in an apparatus configured as above, is described. In the present invention, a new user interface method in controlling the list view on a display is disclosed along with a method in which a scroll speed of the list view may be controlled without a finger touching a screen (i.e., without a touch input), or using a tilt of a corresponding apparatus after an initial touch input.

Figure 2:
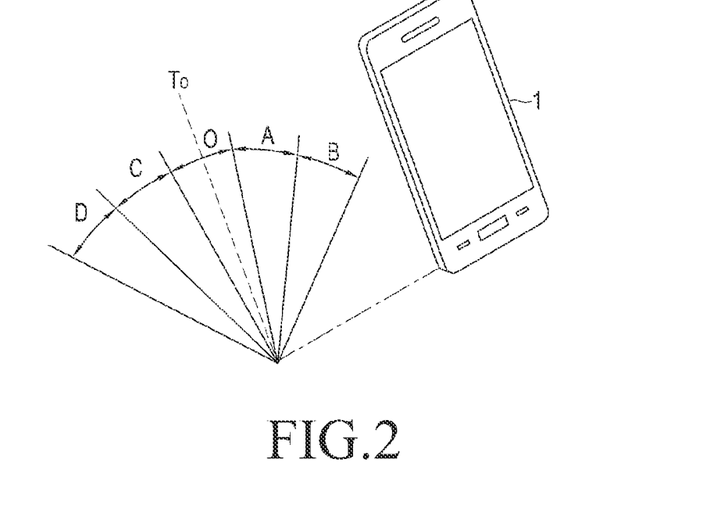
FIG. 2 illustrates a setting state of a tilt section of a portable terminal for performing a screen-scroll of a display apparatus according to an embodiment of the present invention.
Figure 3:
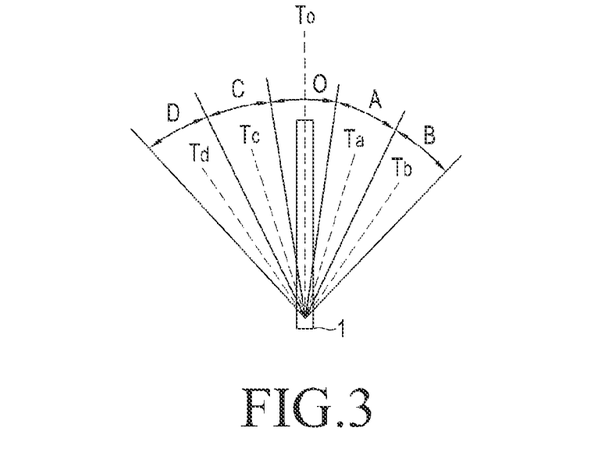
FIG. 3 is a side view of FIG. 2.
Figure 5:
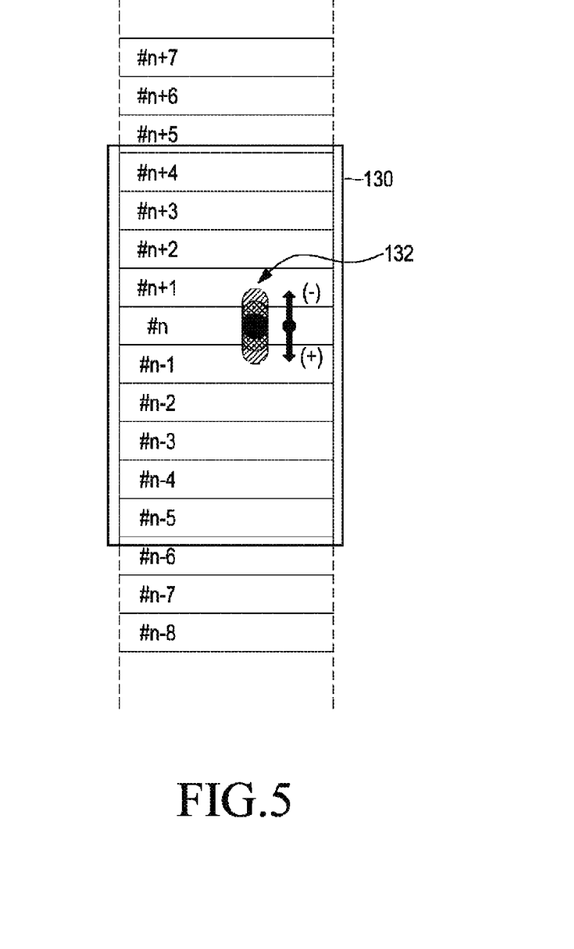
FIG. 5 illustrates a list view of a portable terminal for performing a screen-scroll of a display apparatus according to an embodiment of the present invention.

To this end, as shown in FIGS. 2 and 3, a plurality of tilt sections relative to an axis with respect to the corresponding apparatus 1 are set in advance. The plurality of tilt sections may be divided as, for example, forward direction (+) tilt sections (sections A, B) relative to an initial position section (section o) and forward direction (−) tilt sections (sections C, D), as described later. In the example of FIGS. 2 and 3, the tilt section is set according to a corresponding state when the corresponding apparatus (terminal) 1 is placed vertically. In this case, as shown in FIG. 5, a list view in which list items in a bar type are displayed in a plurality of rows in a display screen 130 may be scrolled up and down in the screen.

Figure 4:
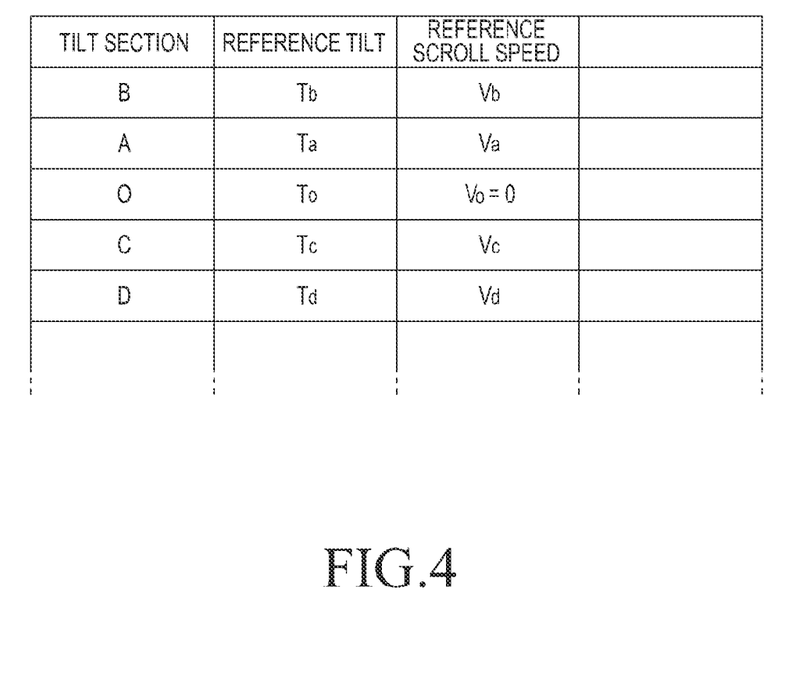
FIG. 4 illustrates a preset tilt section and related information for performing a screen-scroll of a display apparatus according to an embodiment of the present invention.

As shown in FIG. 4, when it is assumed that each tilt section is section A, section B, section O, section C, and section D, in each tilt section, for example, a central tilt, which is a reference tilt of a corresponding tilt section, is determined as Ta, Tb, To, Tc, Td. A reference speed of the screen-scroll is each determined as Va, Vb, Vo, Vc, Vd for each tilt section. If Vo is a speed 0 at a stationary state, a level of each reference scroll speed is determined as Va>Vb>Vo (=0)>Vc>Vd. A symbol (+) of the Va, Vb is 30 different from a symbol (−) of the Vc, Vd, which indicates that the screen-scroll directions thereof are opposite. In other words, in the example shown in FIGS. 4-5, when a flick input 132 occurs in an upward (−) and downward (+) direction of the screen, a screen-scroll operation may be performed such that a screen movement of the list view may occur from the bottom toward the top of the screen, or from the top toward the bottom, and a symbol of a screen-scroll speed is determined as a negative number or a positive number, respectively.

As above, a tilt section and information related thereto may be set in advance, and setting of a number of a plurality of tilt sections, a scroll direction, and a speed may be selectively set based on user convenience. The tilt section may also be divided into two stationary sections and other sections to set such that a level of the screen-scroll speed of the list view may be continuously varied according to a degree of the tilt in a section other than the stationary section.

When the tilt section is preset, if a screen-scroll mode state is entered in a list view state, a tilt of a corresponding apparatus becomes a reference at a time when a current screen-scroll mode is generated, such that a current tilt of the corresponding apparatus is set as the reference tilt of the initial position section (section O) of the tilt section. When the tilt of the apparatus is changed such that the tilt of the corresponding apparatus deviates from the initial location section and corresponds to other tilt section, the current screen-scroll speed may be maintained or changed according to a scroll speed set for a corresponding tilt section.

For example, as shown in FIG. 5, when the flick input 132 is made, the screen moves while the screen-scroll of the list view is decreased when the finger is lifted. The tilt of the apparatus at a moment when the flick is generated becomes the reference tilt. Before the screen-scroll stops completely, when the terminal is tilted such that the tilt of the terminal enters to section A (or section C), a speed Vi (hereinafter entry speed) of the scroll at the time of the entry is maintained. Unless there is made an additional touch input or the terminal returns to an initial location and a stop condition of the screen-scroll operation such as a complete stop of the screen-scroll is met, the screen-scroll operation according to the tilt of the terminal may be continuously performed.

An example of an operation of the present invention relative to the entry speed Vi at the time when the tilt of the terminal enters section A or section C is described below.

$$0 < Vi(\text{entry speed}) < Va \qquad 1)$$

The entry speed (current speed Vi) is set as the scroll speed of section A (i.e., the current screen-scroll speed is maintained) and a coordinate system of the tilt section is changed such that the current tilt of the terminal is equal to the reference tilt Ta of section A, thereby matching the coordinate system to the current tilt of the terminal. In this case, if the terminal is further tilted to enter into section B, the scroll speed is set as the reference scroll speed Vb of section B, and if the terminal returns from section B to section A, the screen-scroll speed is changed to the scroll speed Va preset for section A, not the entry speed Vi.

$$[Va < Vi(\text{entry speed}) < Vb] \text{ or } [Vb < Vi(\text{entry speed})] \qquad 2)$$

The entry speed (current speed Vi) is set as the scroll speed of section B and the coordinate system of the tilt section is changed such that the current tilt of the terminal is equal to the reference tilt Tb of section B, thereby matching the coordinate system to the current tilt of the terminal. In this case, if the tilt section is not further assigned, the current screen-scroll speed is maintained even if the terminal is further tilted and enters into section B, and if the terminal is tilted less and returns to section A, the screen-scroll speed is changed to the scroll speed Va preset for section A, not the entry speed Vi.

$$0 > Vi(\text{entry speed}) > Vc \qquad 3)$$

The entry speed (current speed Vi) is set as the screen-scroll speed of section C and the coordinate system of the tilt section is changed such that the current tilt of the terminal is equal to the reference tilt Tc of section C, thereby matching the coordinate system to the current tilt of the terminal. In this case, if the tilt of the terminal is further entered into section D, the screen-scroll speed is set as the reference scroll speed Vd of section D, and if the terminal returns to section C, the screen-scroll speed is changed to Vc.

$$[Vc > Vi(\text{entry speed}) > Vd] \text{ or } r[Vd > Vi(\text{entry speed})] \qquad 4)$$

The entry speed (current speed Vi) is set as the speed of section D and the coordinate system of the tilt section is matched to the current tilt of the terminal such that the current tilt of the terminal is equal to the reference tilt Td of section D. In this case, if section is not further assigned, the current screen-scroll speed is maintained even if the terminal is further tilted, and if the terminal is tilted less and returns to section C, the screen-scroll speed returns to Vc originally set for this section, not the entry speed Vi.

Thus, an operation of each section may be performed. However, when the section is not divided and the screen-scroll speed is increased proportionally according to an angle of tilt outside of the stationary section, when the terminal is tilted more than a reference angle (i.e., deviates from the stationary section) when the screen-scroll is moved according to the flick input, the reference of the terminal tilt is determined based on the entry speed at a moment thereof, and the screen-scroll speed may be increased or decreased relative to the entry speed according to the degree of the tilt.

It should be noted that, similar to using a conventional User Interface (UI), when the tilt of the terminal is not significantly changed (e.g., the tilt of the terminal is within the preset stationary section), manipulation according to a general drag and flick may be concurrently performed.

Figure 6:
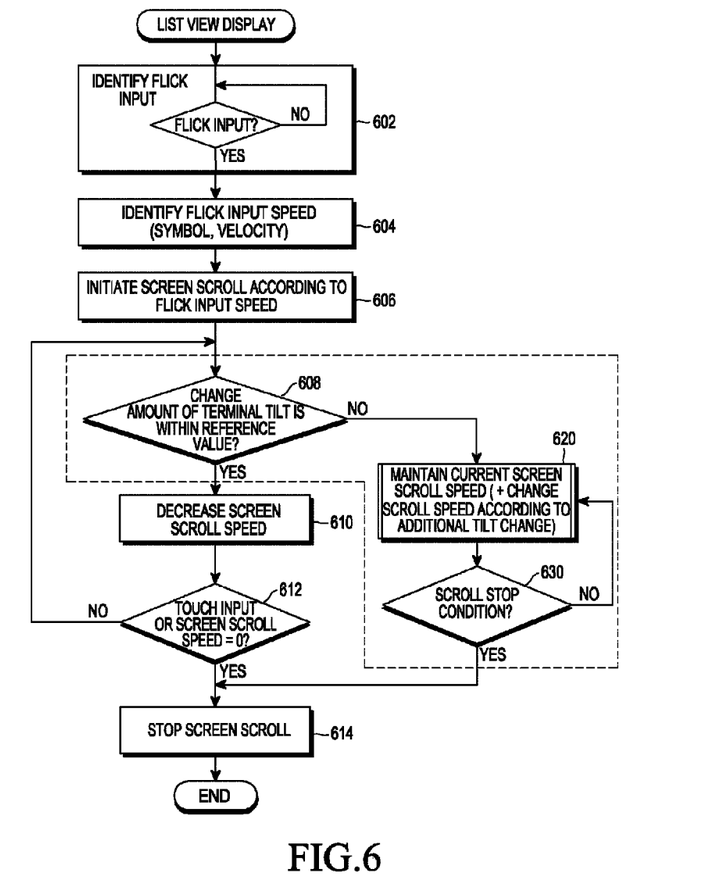
FIG. 6 illustrates a screen-scroll operation of a display apparatus according to an embodiment of the present invention.

FIG. 6 illustrates a screen-scroll operation of a display apparatus according to an embodiment of the present invention. Referring to FIG. 6, the screen-scroll operation performed in a list view display state. In step 602, it is determined whether the flick input is generated, and when generation of the flick input is determined, step 604 is performed. In step 604, a speed (symbol, velocity) of the flick input currently generated is determined, and In step 606, the screen-scroll is initiated according to a flick input speed.

In step 608, by identifying the tilt of the terminal, the tilt of the terminal is compared with the initial location (i.e., location at a time of the flick input) to determine whether a change amount is within a reference value. If the change amount is within the reference value according to a determination result, step 610 is subsequently performed, and if the change amount is not within the reference value, step 620 is performed.

In step 610, the current screen-scroll speed is decreased by a predetermined level, and in step 612, it is determined whether the additional touch input is made or the screen-scroll speed becomes 0. If the additional touch input is made or the screen-scroll speed becomes 0 according to a determination result, step 614 is subsequently performed to stop the screen-scroll operation. Otherwise, the method returns to step 608 to repeatedly perform the above step.

However, in step 610 which is performed when the terminal is compared with the initial location (i.e., location at the time of the flick input) and determined to deviate from the reference value in step 608, the current screen-scroll speed is maintained, and an operation of changing the scroll speed according to a change of the tilt may be additionally performed. In step 630, the scroll-stop condition, such as whether there is a touch input or the terminal tilt returns to the initial location and a complete screen-scroll stops is determined, and if the scroll-stop condition is met, then step 614 is performed.

The foregoing steps, other than steps 608, 620, and 630, may be similar to the screen-scroll operation, which is performed upon the flick input in a conventional list view display state.

Figure 7:
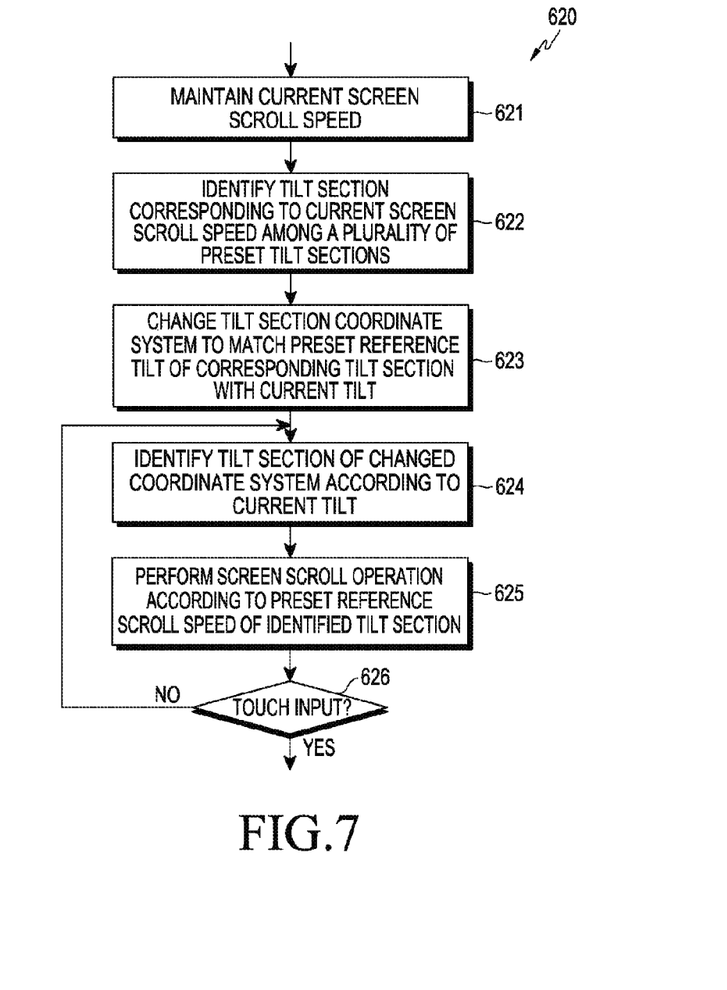
FIG. 7 illustrates a main step of FIG. 6.

FIG. 7 illustrates a main operation of FIG. 6, in particular, an example of a detailed operation flow of step 620. Referring to FIG. 7, in step 621, the current screen-scroll speed is maintained. In step 622, a tilt section corresponding to the current screen-scroll is identified among a plurality of preset tilt sections. In step 623, the tilt section coordinate system is changed such that a reference tilt of the corresponding tilt section matches to the current tilt.

In step 624, the reference tilt section of the changed coordinate system according to the current tilt is identified and, in step 625, the screen-scroll operation is performed according to the reference scroll speed of the identified tilt section. In step 625, when there is no change in the identified tilt section, the current screen-scroll speed is maintained, and accordingly, an initial screen-scroll speed may be continuously maintained in step 621. When the identified tilt section returns to the tilt section of the initial location, the screen-scroll speed may be gradually decreased to 0.

In step 626, whether the touch input is made is determined and, when the touch input is made, step 624 is performed to repeatedly perform the above process, and when the touch input is made, a subsequent step is performed.

As described in step 626, whether the screen-scroll operation is stopped is determined according to whether the touch input is made, and alternatively, an operation may be performed such that the screen-scroll operation is determined to stop when it is detected that the screen-scroll speed becomes 0.

Figure 8:
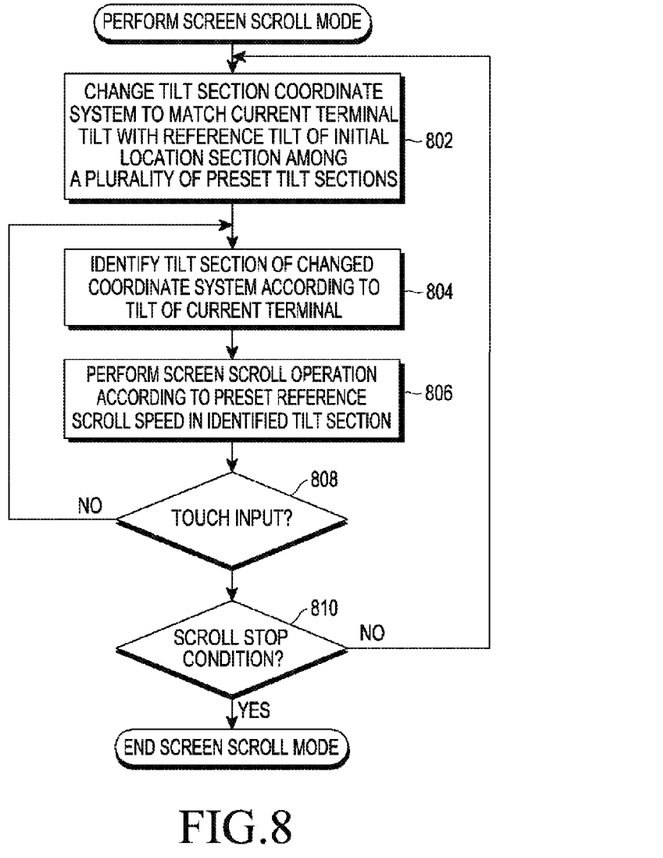
FIG. 8 illustrates a screen-scroll operation of a display apparatus according to another embodiment of the present invention.

FIG. 8 illustrates a screen-scroll operation of a display apparatus according to another embodiment of the present invention. In FIG. 8, the screen-scroll operation is performed without the flick input and, for example, it may be preset that a screen-scroll mode operation shown in FIG. 8 is automatically started when performing a list view display operation is initiated. Referring to FIG. 8, in step 802, the tilt section coordinate system is changed such that the current tilt of a terminal matches with the reference tilt of the initial location section among a plurality of the preset tilt sections.

In step 804, the tilt section of the changed coordinate system according to the current tilt of the terminal is identified. In step 806, the screen-scroll operation is performed according to the reference scroll speed of the identified tilt section. When the identified tilt section returns to a tilt section of the initial location, the screen-scroll speed may be gradually decreased to 0.

In step 808, it is determined whether a touch input is made, and when the touch input is not made, the method returns to step 804 to repeatedly perform the above step and, when the touch input is made, the method proceeds to step 810. In step 810, it is determined whether the scroll stop condition such as an additional touch input is met, and when scroll stop condition is not met, the method returns to step 802 to repeatedly perform the above step. When scroll stop condition is met, the screen-scroll mode is subsequently terminated.

As shown in FIG. 8, it can be known that, when entering into the screen-scroll mode as in the list view display, the screen-scroll operation is performed by varying the screen-scroll speed, without a separate flick input, according to the change of the tilt relative to the initial tilt of the terminal at the time of the entry. Also, it can be known that the initial location of the tilt of the terminal and a reference tilt section coordinate thereof are reset according to the touch input in step 808. In this case, the flick input may not be needed and, in the structure of the apparatus shown in FIG. 1, the display unit 13 of the touch screen structure may not need to be provided.

Figure 9:
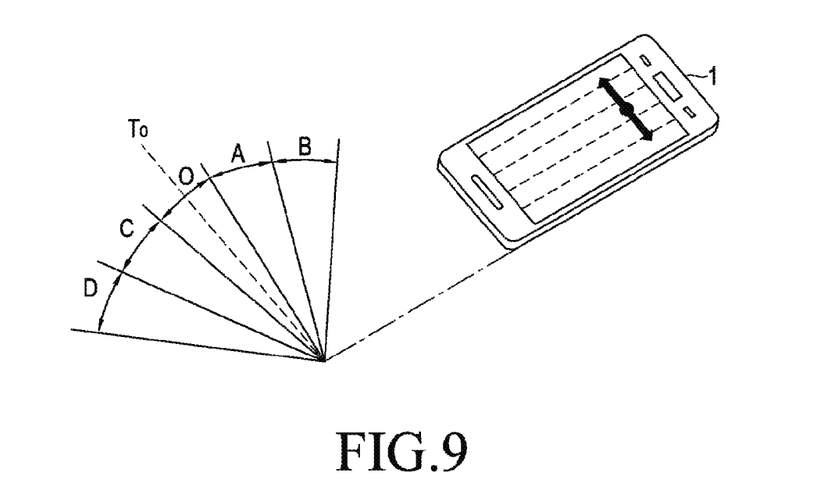
FIGS. 9 to 11 illustrate various modification examples of the present invention.
Figure 10:
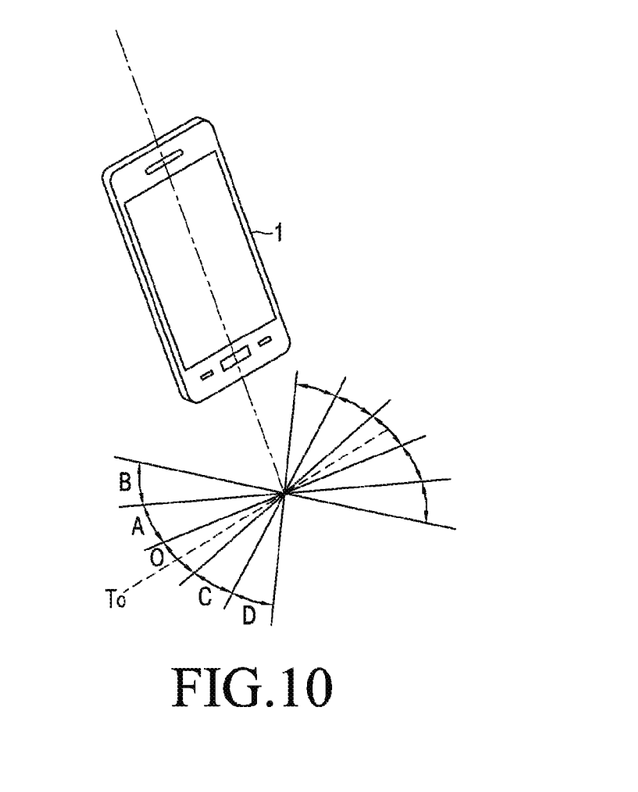
Figure 11:
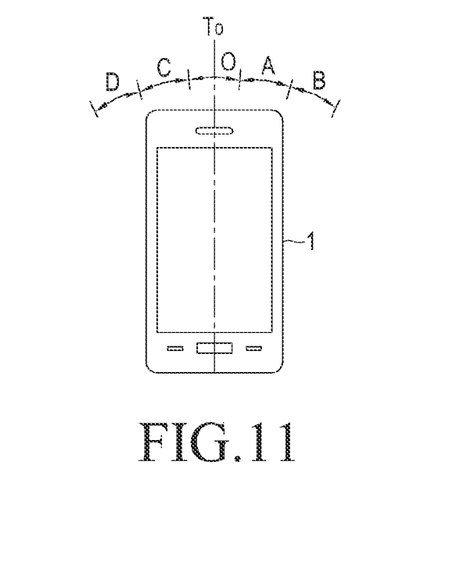

FIGS. 9 to 11 illustrate various modification examples of the present invention. In FIG. 9, different from the above-described embodiments, it is shown that the tilt section may be set according to a tilt condition relative to a state where the terminal lays length-wise instead of width-wise.

In FIG. 10, different from the above embodiments, it is shown that the terminal is not tilted forward or rearward when the terminal lays in the width direction but the tilt section may be set according to rotation of the terminal in a clockwise or counterclockwise direction.

In FIG. 11, different from the above embodiments, it is shown that the terminal is not tilted forward or rearward when the terminal lays in the length direction but the tilt section may be set according to a state of tilting to the left or to the right.

As described above, the present invention may be implemented according to various embodiments, and it should be understood that various modifications or changes of the present invention may be made. For example, in the above description, an example is described in which the screen-scroll operation to which the present invention applies is performed in an up and down direction relative to a position at which the terminal is currently laid, however, it should be noted that the present invention can apply to when the screen-scroll is performed in a left and right direction relative to the position at which the terminal is currently laid.

It should be noted that embodiments of the present invention may be implemented by hardware, software, or a combination of the hardware and the software. The software may be stored in a volatile or non-volatile storage device including a storage device such as a Read-Only Memory (ROM) or a memory such as a Random Access Memory (RAM), a memory chip, or an integrated circuit, and a storage medium such as a Compact Disc (CD), a Digital Video Disc (DVD), a magnetic disk, or a magnetic tape which enables an optical or magnetic recording as well as being readable by a machine It should be understood that a memory, which can be included in a 3D TV is an example of a machine-readable storage medium suitable for storing a program or programs including instructions that implement embodiments of the present invention. Therefore, the present invention includes a machine-readable storage medium that stores a program or programs including codes for implementing a method described by the appended claims. Also, such a program may be electrically transmitted through any medium similar to a communication signal that is propagated by wire or wirelessly, and the present invention includes equivalents thereof.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of scrolling a screen on a display of a hand-held apparatus, comprising:

when a flicking input is detected on the screen, scrolling the screen starting at an initial speed corresponding to a speed of the flicking input and gradually decreasing the scroll speed over time, wherein a tilt of the hand-held apparatus at the time of the flicking input corresponds to an initial tilt;

if the hand-held apparatus tilts from the initial tilt more than a reference value and a scroll stop condition is not met, maintaining a current scroll speed; and if the scroll stop condition is met, stopping scrolling, wherein, unless at least one of the hand-held apparatus tilts from the initial axis more than the reference value and the scroll stop condition is met, the scrolling speed gradually decreases to zero.

2. The method of claim 1, further comprising, after continuing to scroll the screen at the current scroll speed when the the hand-held apparatus tilts from the initial tilt more than the reference value:

varying the speed of the scrolling according to the tilt of the hand-held apparatus.

3. The method of claim 2, wherein varying the speed of the scrolling according to the tilt of the hand-held apparatus comprises:

if the tilt of the hand-held apparatus returns to be about identical to the initial tilt, stopping the scrolling of the screen.

4. The method of claim 2, wherein varying the speed of the scrolling according to the tilt of the hand-held apparatus comprises:

varying the speed of the scrolling according to a difference between the tilt of the hand-held apparatus and the initial tilt, wherein the speed of the scrolling is proportional to the difference.

5. The method of claim 2, wherein varying the speed of the scrolling according to the tilt of the hand-held apparatus comprises:

varying the speed of the scrolling according to which of a plurality of preset tilt ranges the tilt of the hand-held apparatus is in, wherein the preset tilt ranges are set relative to the initial tilt.

6. The method of claim 5, wherein the preset tilt ranges may be re-set relative to a current tilt of the hand-held apparatus.

7. The method of claim 1, wherein the scroll stop condition comprises a touch input.

8. The method of claim 1, wherein the tilt of the hand-held apparatus is measured in an axis from a center of a top of the hand-held apparatus to the center of a bottom of the hand-held apparatus.

9. The method of claim 8, wherein the tilt from the initial tilt is measured in a plane perpendicular to the display of the hand-held apparatus.

10. The method of claim 8, wherein the tilt from the initial tilt is measured in a plane parallel to the display of the hand-held apparatus.

11. The method of claim 1, wherein the tilt of the hand-held apparatus is measured in an axis from a center of a side of the hand-held apparatus to the center of an opposite side of the hand-held apparatus and the tilt from the initial axis is measured in a plane perpendicular to the display of the hand-held apparatus.

12. A method of scrolling a screen on a display of a hand-held apparatus, comprising:

when a flicking input is detected on the screen, scrolling the screen starting at an initial speed corresponding to a speed of the flicking input, wherein a tilt of the hand-held apparatus at the time of the flicking input corresponds to an initial tilt;

if the hand-held apparatus does not tilt from the initial tilt more than the reference value and a scroll stop condition is not met, gradually decreasing the scrolling speed;

if the hand-held apparatus tilts from the initial tilt more than a reference value and the scroll stop condition is not met, changing a current scrolling speed an amount proportional to the tilt of the hand-held apparatus from the initial tilt; and if the scroll stop condition is met, stopping scrolling.

13. A non-transitory computer-readable recording medium having recorded thereon a computer program for executing a list view operation for scrolling a screen on a display of a hand-held apparatus, comprising:

when a flicking input is detected on the screen, scrolling the screen starting at an initial speed corresponding to a speed of the flicking input and gradually decreasing the scroll speed over time, wherein a tilt of the hand-held apparatus at a time of the flicking input corresponds to an initial tilt;

if the hand-held apparatus tilts from the initial tilt more than a reference value and a scroll stop condition is not met, maintaining a current scroll speed; and if the scroll stop condition is met, stopping scrolling, wherein, unless at least one of the hand-held apparatus tilts from the initial tilt more than the reference value and the scroll stop condition is met, the scrolling speed gradually decreases to zero.

14. A non-transitory computer-readable recording medium having recorded thereon a computer program for executing a list view operation for scrolling a screen on a display of a hand-held apparatus, comprising:

when a flicking input is detected on the screen, scrolling the screen starting at an initial speed corresponding to a speed of the flicking input, wherein a tilt of the hand-held apparatus at a time of the flicking input corresponds to an initial tilt;

if the hand-held apparatus does not tilt from the initial tilt more than the reference value and a scroll stop condition is not met, gradually decreasing the scrolling speed;

if the hand-held apparatus tilts from the initial tilt more than the reference value and the scroll stop condition is not met, changing a current scrolling speed an amount proportional to the tilt of the hand-held apparatus from the initial tilt; and if the scroll stop condition is met, stopping scrolling.

15. A hand-held apparatus which executes a list view operation, comprising:

a display capable of touch input;

a motion sensor; and a controller which:

when a flicking input is detected on a screen shown in the display, controls the display to scroll the screen starting at an initial speed corresponding to a speed of the flicking input and to gradually decrease the scroll speed over time, wherein a tilt of the hand-held apparatus at a time of the flicking input corresponds to an initial tilt;

if the motion sensor indicates that the hand-held apparatus tilts from the initial tilt more than a reference value and a scroll stop condition is not met, controls the display to maintain a current scroll speed; and if the scroll stop condition is met, controls the display to stop scrolling, wherein, unless at least one of the hand-held apparatus tilts from the initial tilt more than the reference value and the scroll stop condition is met, the scrolling speed gradually decreases to zero.

16. A hand-held apparatus which executes a list view operation, comprising:

a display capable of touch input;

a motion sensor; and a controller which:

when a flicking input is detected on the screen, scrolling the screen starting at an initial speed corresponding to a speed of the flicking input, wherein a tilt of the hand-held apparatus at a time of the flicking input corresponds to an initial tilt;

if the hand-held apparatus does not tilt from the initial tilt more than a reference value and a scroll stop condition is not met, gradually decreasing the scrolling speed;

if the hand-held apparatus tilts from the initial tilt more than the reference value and the scroll stop condition is not met, changing a current scrolling speed an amount proportional to the tilt of the hand-held apparatus from the initial tilt; and if the scroll stop condition is met, stopping scrolling.

* * * * *